(12) United States Patent
Marbach et al.

(10) Patent No.: US 11,909,191 B1
(45) Date of Patent: Feb. 20, 2024

(54) ELECTRICAL JUNCTION APPARATUS WITH SLIDING SLEEVE CONTAINMENT

(71) Applicant: Power Feed-Thru Systems and Connectors LLC, Deer Park, TX (US)

(72) Inventors: Brandon Lee Marbach, Spring, TX (US); Roy Lee Kinkaid, Humble, TX (US); James Patrick Payne, League City, TX (US); Albert George Ollre, V, Houston, TX (US)

(73) Assignee: Power Feed-Thru Systems and Connectors LLC, Deer Park, TX (US)

( * ) Notice: Subject to any disclaimer, the term of this patent is extended or adjusted under 35 U.S.C. 154(b) by 0 days.

(21) Appl. No.: 18/126,836

(22) Filed: Mar. 27, 2023

(51) Int. Cl.
*H02G 3/06* (2006.01)
*H02G 1/00* (2006.01)

(52) U.S. Cl.
CPC ............ *H02G 3/0616* (2013.01); *H02G 1/00* (2013.01)

(58) Field of Classification Search
CPC .......... H02G 3/06; H02G 3/0616; H02G 1/00; H02G 3/30; H02G 3/36; H02G 15/00; H02G 15/06
USPC ...... 174/84 R, 50, 520, 68.1, 85, 73.1, 88 R, 174/70 C, 95, 480, 481, 535, 542, 559, 174/560, 60, 72 C; 285/154.1, 149.1, 285/154.3, 154.4; 138/111, 155, 118.1
See application file for complete search history.

(56) References Cited

U.S. PATENT DOCUMENTS

| | | | | | |
|---|---|---|---|---|---|
| 4,172,212 | A | * | 10/1979 | Heinzer | H02G 15/14 174/50 |
| 4,785,139 | A | * | 11/1988 | Lynch | H02G 15/14 174/50 |
| 4,886,938 | A | * | 12/1989 | Rottmar | H02G 3/0633 174/559 |
| 5,929,719 | A | * | 7/1999 | Turner | H01R 13/665 174/84 R |
| 6,423,902 | B1 | * | 7/2002 | Babiel | H01R 13/665 174/84 R |
| 8,445,782 | B2 | * | 5/2013 | Jaffari | F16L 25/01 174/84 R |
| 8,697,995 | B2 | * | 4/2014 | Vallauri | H02G 15/1826 174/29 |
| 8,772,637 | B2 | * | 7/2014 | Wu | H02G 15/117 174/91 |

* cited by examiner

*Primary Examiner* — Angel R Estrada
(74) *Attorney, Agent, or Firm* — Alexander B. Uber; Gray Reed (57) ABSTRACT

An electrical junction apparatus for accessing and sealing electrical connections comprising a housing, a removeable sleeve, and a fastener removably secured to a first portion of the housing that secures the outer sleeve to the housing. A method for accessing electrical connections in an electrical junction apparatus involves loosening a first and second fastener from a first and second portion of a housing respectively, removing a tightener from the first portion of the housing, and removing the sleeve from the housing. A method for sealing electrical connections involves installing a sleeve around a housing, positioning a tightener against the sleeve and the first portion of the housing, engaging a first fastener against the tightener and engaging a second fastener with the second portion of the housing and the sleeve.

19 Claims, 5 Drawing Sheets

ELECTRICAL JUNCTION APPARATUS WITH SLIDING SLEEVE CONTAINMENT

CROSS-REFERENCE TO RELATED APPLICATIONS

Not Applicable.

BACKGROUND

Technical Field

Novel aspects of the present disclosure relate to electrical conduits, and more particularly to apparatuses and corresponding methods for accessing and sealing electrical connections within the electrical conduit.

Description of Related Art

Electrical conduits are components of an industrial electrical wiring system that house electrical connections. Electrical conduits group wires together to save space within an electrical unit and to protect the electrical connections from external interference, such as corrosion.

From time-to-time, technicians need to make or break electrical connections housed within an electrical conduit. To access the electrical connections within the electrical conduits, conduits contain conduit bodies called conduit boxes. Conduit boxes protect the electrical connections inside while also allowing electricians to access the electrical connections.

Depending on the design of the conduit box, accessing these electrical connections can be unduly burdensome. Difficulty in accessing electrical connections can lead to unintentional damage to the electrical connections or electrocutions to electricians. Thus, there exists a need to improve accessibility of electrical connections housed in conduit boxes.

BRIEF SUMMARY

Novel aspects of the present disclosure are directed to an electrical junction apparatus with a removeable outer sleeve for accessing electrical connections. In a non-limiting illustrative embodiment, the apparatus comprises a housing configured to contain the electrical connections and an outer sleeve configured to contain electrical connections. The outer sleeve is removably attached to the outer surface of the housing. The apparatus further comprises a fastener removably secured to a first portion of the housing, wherein the fastener secures the outer sleeve to the housing. When the outer sleeve is removed, the electrical connections are accessible.

In another non-limiting illustrative embodiment, the present disclosure is directed to a method for accessing electrical connections in a junction apparatus comprising a housing, an outer sleeve, a first fastener, a second fastener, and a tightener. The method includes loosening the first fastener from a first portion of a housing, loosening the second fastener from a portion of an outer sleeve, removing the tightener from the first portion of the housing, and removing the outer sleeve from an outer surface of the housing.

In another non-limiting illustrative embodiment, the present disclosure is directed to a method for sealing electrical connections in an electrical junction apparatus comprising a housing, an outer sleeve, a first fastener, a second fastener, and a tightener. The method includes installing the outer sleeve around a first and second portion of a housing, positioning the tightener against the outer sleeve and the first portion of the housing. The method further includes engaging the first fastener against the tightener and engaging the second fastener with the second portion of the housing and the outer sleeve, thereby forming a seal between the outer sleeve and the first and second portions of the housing.

BRIEF DESCRIPTION OF THE DRAWINGS

The preceding aspects and many of the attendant advantages of the present technology will become more readily appreciated by reference to the following Detailed Description when taken in conjunction with the accompanying simplified drawings of example embodiments. The drawings briefly described below are presented for ease of explanation and do not limit the scope of the claimed subject matter.

DETAILED DESCRIPTION

It is customary to utilize what is referred to as a line box ("LB") conduit box to house electrical connections at the point where electrical conduits change directions. An LB conduit box typically includes a cast electrical box with entries about 90 degrees apart and a detachable lid. The electrical connections are recessed in the conduit box. The configuration makes it difficult to access the internal electrical connection because it all work must be done within the confines of the box.

Novel aspects of this disclosure recognize the need for improving the ease of accessing internal electrical connections housed within conduit boxes. The solution can allow for circumferential access to housed electrical connections—greatly improving the working area available for maintaining or repairing electrical connections. Additionally, the solution can improve speed and ease of accessing the electrical connections. The solution also promotes maintaining the insulating properties to protect the electrical connections from external interference.

Figure 1:
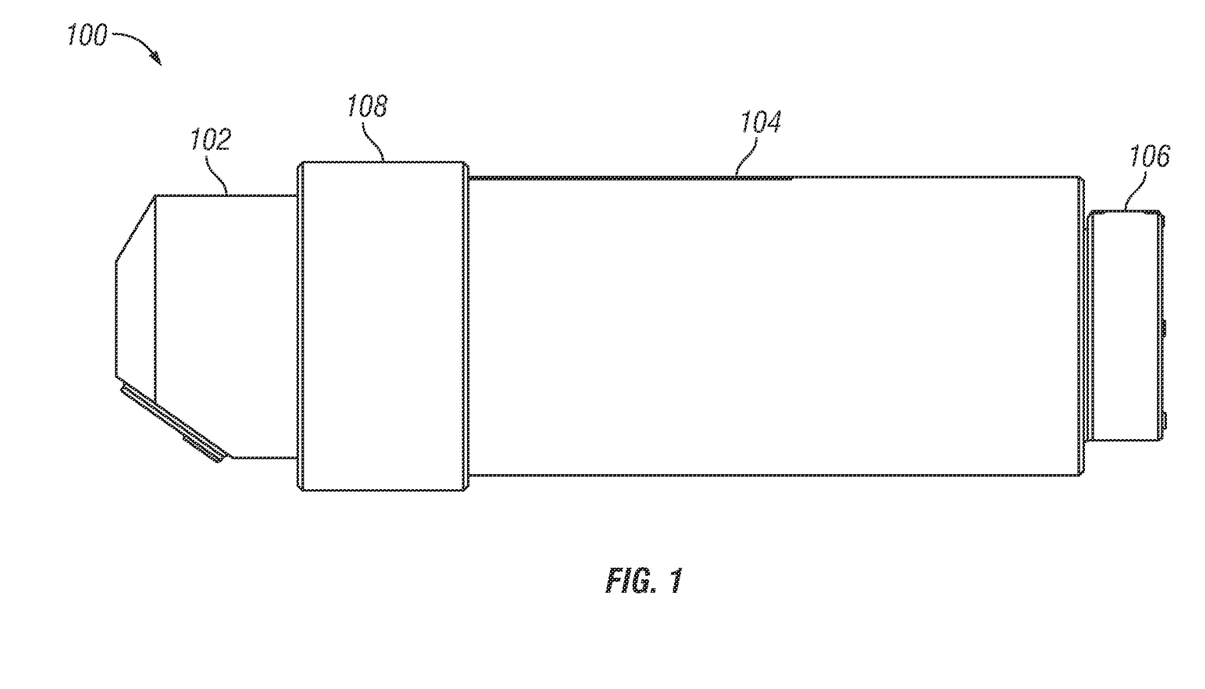
FIG. 1 depicts an electrical junction apparatus according to an illustrative embodiment.

FIG. 1 depicts an electrical junction apparatus 100 according to an illustrative embodiment. The electrical junction apparatus 100 can include a housing 102 that may function as a conduit. An outer sleeve 104 can be removably attached to an outer surface of the housing 102 thereby forming a seal between the housing 102 and the outer sleeve 104. In the illustrative embodiment, a first fastener 106 may be configured to secure the outer sleeve 104 to the housing 102. The electrical junction apparatus 100 can also include a second fastener 108 further configured to secure the outer sleeve 104 to the housing 102.

In at least one example, the housing 102 comprises a first portion and a second portion (not illustrated). In the illustrative embodiment, the outer sleeve 104 partially envelops the housing, extending between first and second portions of the housing 102, thereby forming a seal on each portion. As illustrated at least in FIG. 3, the two housing portions can be separate components.

With continued reference to FIG. 1, the first portion of the housing 102 can be configured to engage with the first fastener 106, which can be removably secured to the first portion. When the outer sleeve 104 is installed around the first and the second housing portions of the housing 102, the first fastener 106 can secure the outer sleeve 104 to the housing 102. Additionally, the electrical junction apparatus 100 can include a second fastener 108 configured to engage with a second portion of the housing 102. The second fastener can be removably secured to the second portion of the housing 102. The second fastener 106 can also secure the outer sleeve 104 to the housing 102 when the outer sleeve is installed around the first and the second housing portions. The first fastener 106 and the second fastener 108 can be configured to engage with the first and second portions respectively as to abut opposing ends of the outer sleeve 104 when it envelops the housing portions. In this way, the first and second fasteners 106, 108 can provide additional strength to secure the outer sleeve 104.

Figure 2:
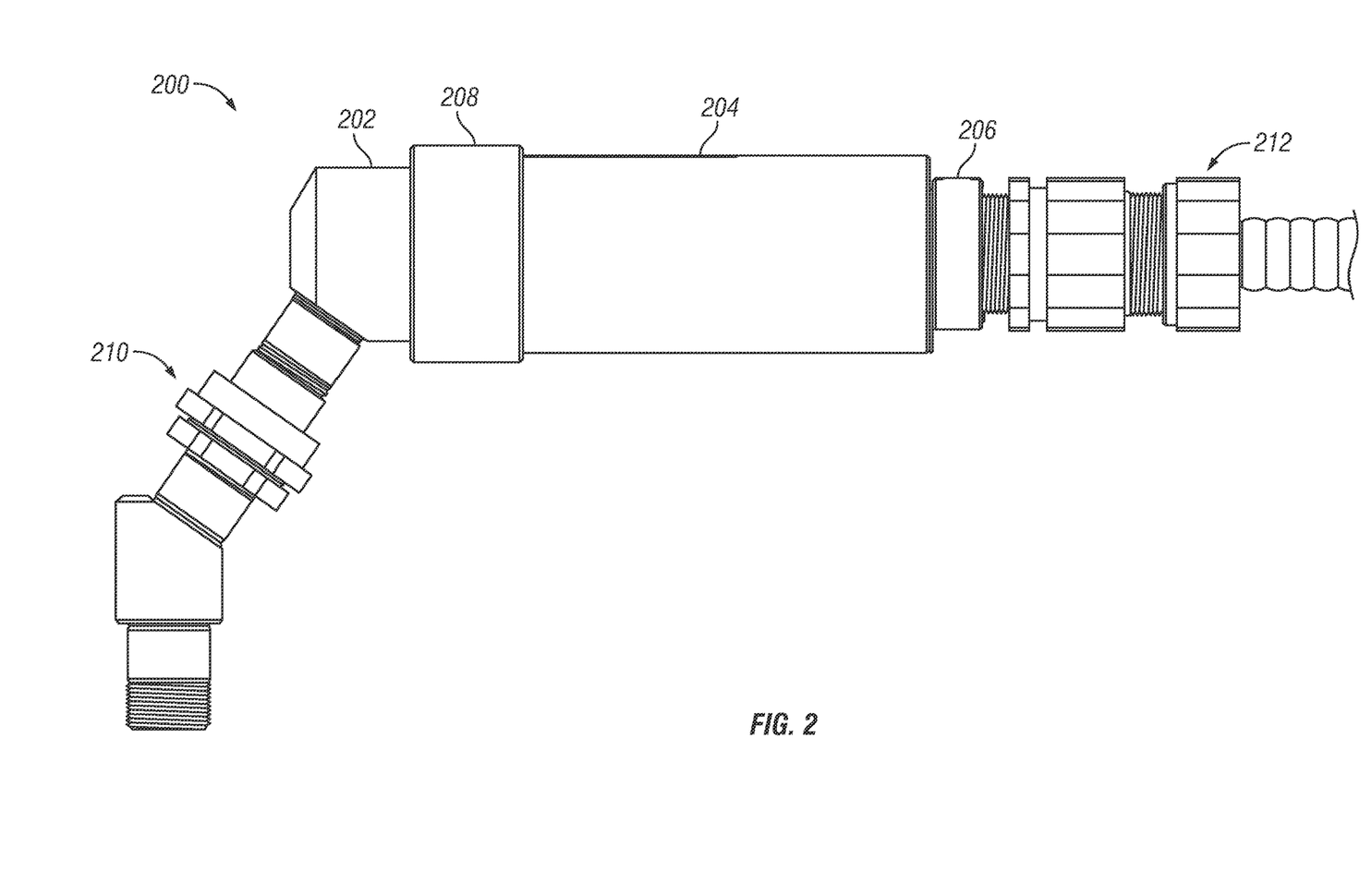
FIG. 2 depicts an electrical junction apparatus coupled between conduit connectors according to an illustrative embodiment.

Turning to FIG. 2, an illustrative embodiment of an electrical junction apparatus 200 coupled between conduits 210 and 212 is illustrated. The electrical junction apparatus 200 can comprise a housing 202 enveloped by a removably attached outer sleeve 204. The housing 202 can include a first and a second portion. A first fastener 206 can be configured to engage the first portion of the housing 202 to secure the outer sleeve 204. A second fastener 208 can be configured to engage the second portion of the housing 202 to further secure the outer sleeve 204. A longitudinal conduit 212 can be configured to engage with the first portion of the housing 202 and an angular conduit 210 can be configured to engage with the second portion of the housing 202.

The first fastener 206 and/or the second fastener 208 can be configured to envelop the outer sleeve 204 as part of engaging with the first or second portions of the housing 202 respectively. As shown in the illustrative embodiment in FIG. 2, the second fastener 208 envelops one end of the outer sleeve 204 while the first fastener 206 does not. An advantage of having fasteners envelop only one end of the outer sleeve 204 is that the outer sleeve 204 can be configured to slide off the housing 202 in a single direction (e.g., away from the fastener that envelops its end), which improves the reliability of accessing and/or sealing the electrical connections within the housing because a user can only remove the outer sleeve 204 in a single direction. The first and second fasteners 206, 208 can include, but are not limited to, a threaded nut, clasp, zipper, hook and loop, magnet, or any other fastener known in the art.

Figure 3:
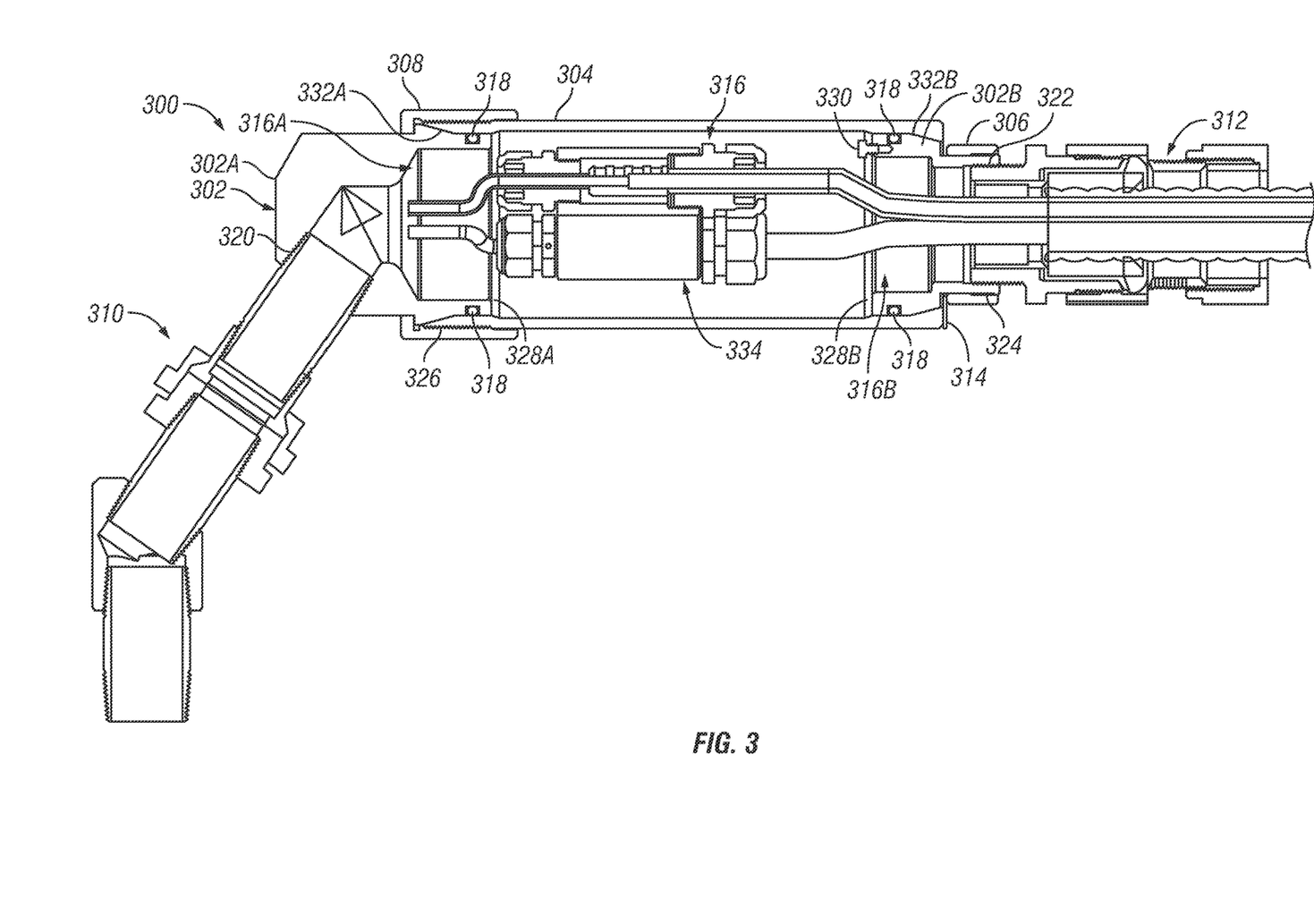
FIG. 3 depicts a cutaway view of an electrical junction apparatus coupled between conduit connectors according to an illustrative embodiment.

Referring to FIG. 3, a cutaway view of an electrical junction apparatus 300 coupled between conduits 310 and 312 according to an illustrative embodiment is depicted. The electrical junction apparatus 300 can comprise a housing 302 enveloped by a removably attached outer sleeve 304. The outer sleeve 304 can form a seal with the housing, thereby shielding the electrical connections 334 from the environment. The housing 302 can include a first portion 302B and a second portion 302A. A first fastener 306 can be configured to engage the first portion 302B to secure the outer sleeve 304. A second fastener 308 can be configured to engage the second portion 302A to further secure the outer sleeve 304. A longitudinal conduit 312 can be configured to engage with the first portion 302B of the housing 302 via the first fastener 302. An angular conduit 310 can be configured to engage with the second portion 302A of the housing 302.

In an alternative embodiment, the second portion 302A of the housing 302 may be configured to engage with multiple conduits. The second portion 302A of the housing 302 may be configured to engage with one or more conduits at an angle or in a coaxial plane, as the disclosed electrical junction apparatus 300 is adaptable to function with single or multiple cable entry lines.

The housing 302 can include one or more O-rings 318 disposed between the housing 302 and the outer sleeve 304. In some embodiments, the O-rings 318 can be disposed between the first portion of the housing 302B and the outer sleeve 304. Additionally, the O-rings 318 can be disposed between the second portion of the housing 302A and the outer sleeve 304. The O-rings 318 are configured to tighten the seal between the housing 302 and the outer sleeve 304. In some embodiments, the elastomeric O-rings 318 make the seal watertight. The O-rings 318 may comprise an elastomeric O-ring or any other type of sealant known in the art.

The electrical junction apparatus 300 can form an outer sleeve void 316 defined by the outer sleeve 304 when it envelops the housing 302. The first portion of the housing 302B can include a first socket 316B and the second portion 302A can include a second socket 316A. The first portion 302B can form a conduit with the first socket 316B. Similarly, the second portion 302A can form a conduit with the second socket 316A. In some embodiments, the first 316B and second 316A sockets are configured such that the electrical connections 334 run through the apparatus 300. Collectively, the outer sleeve void 316, the first socket 316B, and the second socket 361A can form a sealed chamber through the electrical junction apparatus 300.

The electrical junction apparatus 300 can enclose one or more electrical connections 334 in the sealed chamber. The electrical connections 334 can be a junction of two or more electrical wires. Each electrical wire can be disposed through the longitudinal conduit 312 and/or the angular conduit 310. When the longitudinal conduit 312 and the angular conduit 310 are coupled to the electrical junction apparatus 300, a continuous sealed chamber may be formed through the coupled components. This chamber can be configured to house electrical wires or other cables. The sealed chamber protects the enclosed wires from external interference, such as moisture, debris, excessive heat or cold, or other environmental effects. In some embodiments, the electrical junction apparatus 300 can be sized and configured to protect the enclosed electrical connections from explosions. The electrical junction apparatus 300 can be further configured to be weathertight.

The first portion of the housing 302B can be a generally annular structure that forms a conduit through the first socket 316B. The first portion 302B can have a larger internal and external diameter on an end facing the second portion 302A than an opposing end facing the longitudinal conduit 312. A larger internal diameter allows the electrical connection 334 to expand radially outwards as it enters the outer sleeve void 316, providing an advantage of easier access to each individual wire/cable. The larger external diameter of the first portion 302B can be sufficiently sized to allow the outer sleeve 304 to slide over the first fastener 306 when it is removed from the housing 302.

In addition, the first portion 302B can include a skive or other acute angle cut 332B configured to interface with a corresponding cut in the outer sleeve 304 (the two interfacing cuts hereinafter referred to as a "skive cut 332B" collectively). In other examples, the first portion 302B can include a 90-degree shoulder or serrated teeth configured to interface with a corresponding cut or pattern in the outer sleeve 304. Furthermore, the first portion 302B and the outer sleeve 304 can be configured to interface with each other to form two telescoping cylindrical surfaces. The geometry that forms the interface between the first portion 302B and the sleeve 304 is configured to adhere to the flameproof-joint requirements of various standards.

Also, the first portion 302B of the housing 302 can comprise an outer threaded interface configured to engage with an inner threaded interface 324 of the first fastener 306. In some embodiments, the apparatus 300 can comprise a tightener 314 that is configured to be removably secured between the first fastener 306 and the first portion 302B of the housing 300. When the first fastener 306 is secured to the first portion 302B, the first fastener 306 secures the tightener 314 against the outer sleeve 304, thereby securing the outer sleeve 304 to the housing 302. Loosening the first fastener 306 allows the tightener 314 to be removed, thereby enabling the outer sleeve 304 to be removed from the apparatus 300. As shown in FIG. 3, the tightener 314 can be a bumper plate. The tightener 314 can also include washers with cap screws, coupling magnets, clasps, buttons, snaps, or a combination thereof, or other removably coupled securing means.

Furthermore, as depicted in the illustrative embodiment in FIG. 3, the first portion 302B can comprise an inner threaded interface configured to engage with a threaded interface 322 of the longitudinal conduit 312, thereby removably coupling the longitudinal conduit 312 to the apparatus 300. Alternatively, the longitudinal conduit 312 can be removably coupled to the apparatus using a variety of coupling mechanisms, such as a clasp, zipper, hook and loop, magnet, or any other fastener known in the art.

With continued reference to FIG. 3, the second portion of the housing 302A can be a generally annular structure that forms a conduit through the second socket 316A. The second portion 302A can comprise various geometries to accommodate various geometries for the angled conduit 310. As shown in FIG. 3, the conduit of the second portion 302A facing the first portion 302B forms an angle with the angled conduit 310. The second portion 302A can be configured to engage with various angles of the angled conduit 310, including angles between 0 and 90 degrees from the conduit of the apparatus 300.

The second socket 316A can have a larger internal diameter on an end facing the first portion 302B than an opposing end facing the angled conduit 310. The larger internal diameter allows the electrical connection 334 to expand radially outwards as it enters the outer sleeve void 316 to allow for easier access to each individual wire/cable.

In addition, the second portion 302A can include a skive or other acute angle cut 332A configured to interface with a corresponding cut in the outer sleeve 304 (the two interfacing cuts hereinafter referred to as a "skive cut 332A" collectively). In other examples, the second portion 302A can include a 90-degree shoulder or serrated teeth configured to interface with a corresponding cut or pattern in the outer sleeve 304. Furthermore, the second portion 302A and the outer sleeve 304 can be configured to interface with each other to form two telescoping cylindrical surfaces. The geometry that forms the interface between the second portion 302A and the sleeve 304 is configured to adhere to the flameproof-joint requirements of various standards.

Furthermore, as depicted in the illustrative embodiment in FIG. 3, the second portion 302A can comprise an inner threaded interface configured to engage with a threaded interface 320 of the angled conduit 310, thereby removably coupling the angled conduit 310 to the apparatus 300. Alternatively, the angled conduit 312 can be removably coupled to the apparatus using a variety of coupling mechanisms, such as a clasp, zipper, hook and loop, magnet, or any other fastener known in the art.

The outer sleeve 304 can comprise an outer threaded interface configured to engage with an inner threaded interface 326 of the second fastener 308. The second fastener 308 can be removably secured to the outer sleeve 304 at the second portion 302A. In some embodiments, the second fastener 308 envelops an end of the outer sleeve 304 when it secures the outer sleeve 304 to the housing 302.

Additionally, the outer sleeve 304 can comprise a first angled segment 328B and a second angled segment 328A on its inner-facing diameter. The first angled segment 328B can be configured to angle radially outwards from the first portion of the housing 302B towards the second portion of the housing 302A when the outer sleeve 304 is attached to the housing 302. Similarly, the second angled segment 328A can be configured to angle radially outwards from the second portion 302A towards the first portion 302B when the outer sleeve 304 is attached to the housing 302. The angled segments 328B and 328A expand the inner diameter of the outer sleeve void 318 that houses the electrical connections 334. The sections of the outer sleeve 304 that interface with the first portion 302B and second portion 302A can have a smaller internal diameter to provide additional strength for the seal.

In the illustrative embodiment shown in FIG. 3, removing the first fastener 306 from the first portion 302B and the second fastener 308 from the outer sleeve 304 at the second portion 302A allows the outer sleeve 304 to be removed from the housing 302. In some embodiments, the outer sleeve 304 slides over the second fastener 306 and over the longitudinal conduit 312. The electrical connections 334 contained in the housing are exposed when the outer sleeve 334 is removed. In some embodiments, the electrical connections 334 are circumferentially exposed when the outer sleeve 304 is removed.

Additionally, the first portion 302B or the second portion 302A can include a grounding point 330, such as a screw, configured to couple with a grounding wire (not pictured). Coupling the electrical connection 334 to an electrical ground via the grounding point 330 helps prevent electrical shocks to electricians accessing the electrical connections 334.

Figure 4:
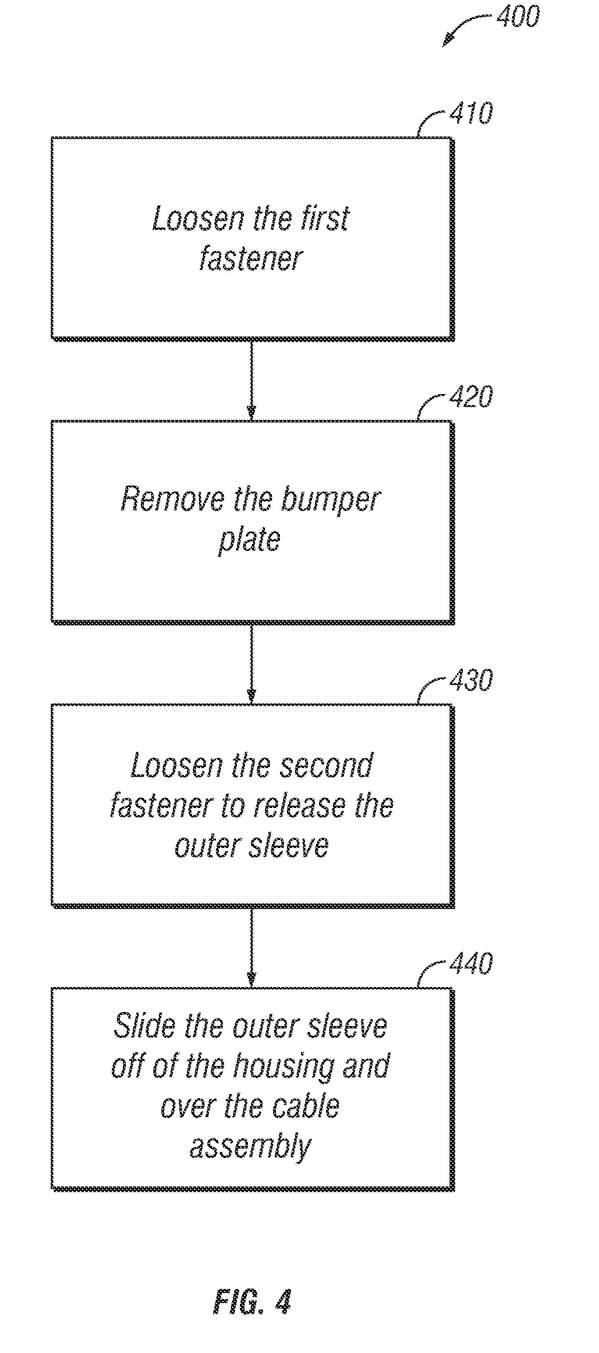
FIG. 4 depicts a flowchart of a process for accessing electrical connections in an electrical junction apparatus.

Turning to FIG. 4, a flowchart of a process 400 for accessing electrical connections in an electrical junction apparatus is depicted. The electrical junction apparatus (such as the apparatuses shown in FIGS. 1-3) can include a housing, an outer sleeve, a first fastener, a second fastener, and a tightener. The housing can include a first portion and a second portion. The outer sleeve is configured to envelop the housing, thereby forming a seal between the first portion of the housing and the outer sleeve as well as forming a seal between the second portion of the housing and the outer sleeve. The first fastener secures the tightener to the first portion of the housing. In some embodiments, a first elastomeric O-ring is disposed between the first portion of the housing and the outer sleeve. The elastomeric O-ring can be configured to form a watertight seal between the first portion of the housing and the outer sleeve. Similarly, a second elastomeric O-ring can be disposed between the second portion of the housing and the outer sleeve—configured to form a watertight seal between the second portion of the housing and the outer sleeve.

In step 410, a user loosens the first fastener from the first portion of the housing. In some embodiments, the first fastener comprises an inner threaded interface engaged with a threaded interface of the first portion of the housing. In those embodiments, loosening the first fastener comprises unscrewing the first fastener from the threaded interface of the first portion of the housing.

In step 420, a user removes the tightener from the first portion of the housing. The tightener secures the outer sleeve to the housing. In some embodiments, the tightener can remain attached to the apparatus when removed. As shown in FIG. 4, the tightener can be a bumper plate. The tightener can also include washers with cap screws, coupling magnets, clasps, buttons, snaps, or a combination thereof, or other removably coupled securing means.

In step 430, a user loosens the second fastener from a portion of the outer sleeve. Loosening the second fastener releases the outer sleeve. The second fastener may be further engaged with a second portion of the housing in addition the outer sleeve. In some embodiments, loosening the second fastener comprises unscrewing the second fastener from the outer threaded interface of the outer sleeve. It should be noted that step 430 may be performed before 410.

In step 440, a user slides the outer sleeve off of the housing and over a cable assembly. In some embodiments, the cable assembly may be a longitudinal conduit, such as those shown in FIGS. 2-3. After the outer sleeve is removed from the housing, a user is able to access the now exposed electrical connections. In some embodiments, the electrical connections are circumferentially exposed for ease of access.

Figure 5:
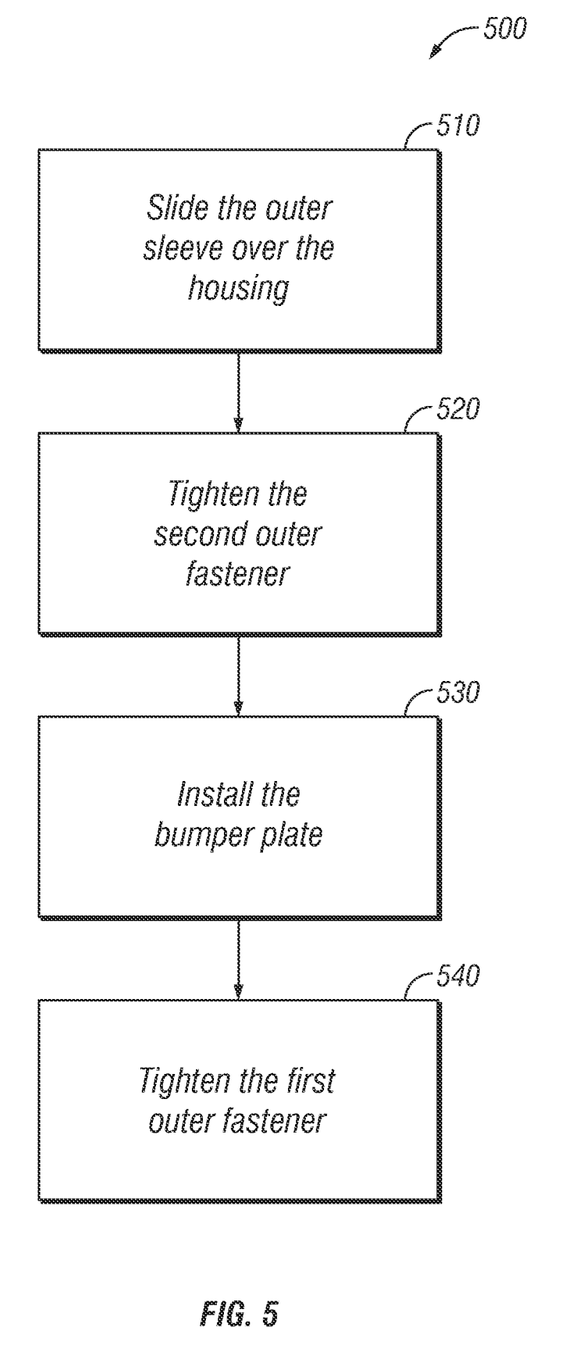
FIG. 5 depicts a flowchart of a process for sealing electrical connections in an electrical junction apparatus.

With reference to FIG. 5, a flowchart of a process 500 for sealing electrical connections in an electrical junction apparatus is shown. The electrical junction apparatus (such as the apparatuses shown in FIGS. 1-3) can include a housing, an outer sleeve, a first fastener, a second fastener, and a tightener. The housing can include a first portion and a second portion. The outer sleeve is configured to envelop the housing, thereby forming a seal between the first portion of the housing and the outer sleeve as well as forming a seal between the second portion of the housing and the outer sleeve. The first fastener secures the tightener to the first portion of the housing. In some embodiments, a first elastomeric O-ring is disposed between the first portion of the housing and the outer sleeve. The elastomeric O-ring can be configured to form a watertight seal between the first portion of the housing and the outer sleeve. Similarly, a second elastomeric O-ring can be disposed between the second portion of the housing and the outer sleeve—configured to form a watertight seal between the second portion of the housing and the outer sleeve.

In step 510, a user installs the outer sleeve around the housing by sliding the outer sleeve over the housing. In some embodiments, the outer sleeve may be disposed around a cable assembly, such as a longitudinal conduit as shown in FIGS. 2-3.

In step 520, the user engages the second fastener with the second portion of the housing and the outer sleeve by tightening the second fastener against the outer sleeve and the second portion of the housing. Engaging the second fastener with the outer sleeve and the second portion of the housing forms a seal between the outer sleeve and the second portion of the housing.

In some embodiments, the second fastener comprises an inner threaded interface configured to engage with an outer threaded interface of the outer sleeve. Engaging the second fastener comprises screwing the second fastener onto the outer threaded interface of the outer sleeve.

In step 530, a user installs the tightener by positioning the tightener against the outer sleeve and the first portion of the housing. The tightener secures the outer sleeve to the housing. In some embodiments, the tightener remains attached to the apparatus when removed. As shown in FIG. 5, the tightener can be a bumper plate. The tightener can also include washers with cap screws, coupling magnets, clasps, buttons, snaps, or a combination thereof, or other removably coupled securing means.

In step 540, a user engages the first fastener against the tightener by tightening the first fastener. The tightener then secures the outer sleeve to the first portion of the housing, thereby forming a seal between the outer sleeve and the first portion of the housing. It should be noted that step 540 may be performed before 520. In some embodiments, the first fastener comprises an inner threaded interface configured to engage with a threaded interface of the first portion of the housing. Engaging the first fastener comprises screwing the first fastener onto the threaded interface of the first portion of the housing.

Additionally, the section headings herein are provided for consistency with the suggestions under 37 C.F.R. § 1.77 or to provide organizational cues. These headings shall not limit or characterize the invention(s) set out in any claims that may issue from this disclosure. Specifically, and by way of example, although the headings refer to a "Technical Field," the claims should not be limited by the language chosen under this heading to describe the so-called field. Further, a description of a technology as background information is not to be construed as an admission that particular technology is prior art to any embodiment(s) in this disclosure. Neither is the "Brief Summary" a characterization of the embodiment(s) outlined in issued claims.

Furthermore, any reference in this disclosure to "invention" in the singular should not be used to argue that there is only a single point of novelty in this disclosure. Multiple embodiments may be set forth according to the limitations of the multiple claims issuing from this disclosure. Such claims accordingly define the embodiment(s) and their equivalents that are protected thereby. In all instances, the scope of such claims shall be considered on their own merits in light of this disclosure but should not be constrained by the headings set forth herein.

Moreover, the Abstract is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the preceding "Detailed Description," it can be seen that various features may be grouped in a single embodiment to streamline the disclosure. This method of disclosure is not to be interpreted as reflecting an intention that the claimed embodiments require more features than are expressly recited in each claim. Instead, as the claims reflect, the inventive subject matter lies in less than all features of a single disclosed embodiment. Thus, the following claims are incorporated into the Detailed Description, with each claim standing on its own as a separate embodiment.

What is claimed is:

1. An apparatus for accessing and sealing electrical connections, the apparatus comprising:
    a housing configured to contain the electrical connections;
    an outer sleeve removably attached to an outer surface of the housing such that the outer sleeve forms a seal around the housing, the outer sleeve extending from a first portion of the housing to a second portion of the housing, wherein the electrical connections contained in the housing are exposed when the outer sleeve is removed; and
a fastener removably secured to the second portion of the housing, wherein the fastener secures the outer sleeve to the housing, and wherein the fastener is configured to at least partially encompass the second portion of the housing.

2. The apparatus of claim 1, wherein the outer sleeve and the second portion of the housing each include a skive cut.

3. The apparatus of claim 2, wherein the outer sleeve and the first portion of the housing each include a skive cut.

4. The apparatus of claim 1, further comprising a second fastener removably secured to the outer sleeve at the first portion of the housing, wherein the second fastener further secures the outer sleeve to the housing.

5. The apparatus of claim 4, further comprising a tightener removably secured between the second fastener and the first portion of the housing, wherein loosening the second fastener removes the tightener thereby enabling the outer sleeve to be removed.

6. The apparatus of claim 1, wherein the housing comprises a first socket at the first portion and a second socket at the second portion, further wherein the first and second sockets are configured such that the electrical connections run through the apparatus.

7. The apparatus of claim 1, further comprising an elastomeric O-ring disposed between the housing and the outer sleeve, wherein the O-ring is configured to tighten the seal between the housing and the outer sleeve.

8. The apparatus of claim 7, wherein the first and second portions comprise corresponding skive cuts.

9. The apparatus of claim 8, wherein the electrical connections are circumferentially exposed when the outer sleeve is removed.

10. The apparatus of claim 1, further comprising a grounding point configured to couple with a ground wire.

11. A method for accessing electrical connections in a junction apparatus comprising a housing, an outer sleeve, a first fastener, a second fastener, and a tightener; the method comprising:
loosening the first fastener from a first portion of the housing;
loosening the second fastener from a portion of the outer sleeve, wherein the second fastener is configured to at least partially encompass a second portion of the housing;
removing the tightener from the first portion of the housing; and
removing the outer sleeve from an outer surface of the housing.

12. The method of claim 11, wherein:
an inner threaded interface of the first fastener is engaged with a threaded interface of the first portion of the housing; and
loosening the first fastener comprises unscrewing the first fastener from the threaded interface of the first portion of the housing.

13. The method of claim 12, wherein:
an inner threaded interface of the second fastener is engaged with an outer threaded interface of the outer sleeve; and
loosening the second fastener comprises unscrewing the second fastener from the outer threaded interface of the outer sleeve.

14. The method of claim 11, wherein the junction apparatus further comprises an elastomeric O-ring disposed between the first portion of the housing and the outer sleeve configured to form a watertight seal.

15. A method for sealing electrical connections in a junction apparatus comprising a housing, an outer sleeve, a first fastener, a second fastener, and a tightener; the method comprising:
installing the outer sleeve around a first and second portion of the housing;
positioning the tightener against the outer sleeve and the first portion of the housing;
engaging the first fastener against the tightener, thereby forming a seal between the outer sleeve and the first portion of the housing; and
engaging the second fastener with the second portion of the housing and the outer sleeve, thereby forming a seal between the outer sleeve and the second portion of the housing, wherein the second fastener is configured to at least partially encompass the second portion of the housing.

16. The method of claim 15, wherein:
the junction apparatus further comprises an elastomeric O-ring disposed in the first portion of the housing, and
installing the outer sleeve includes engaging the outer sleeve with the elastomeric O-ring disposed in the first portion of the housing, thereby forming a watertight seal between the outer sleeve and the first portion of the housing.

17. The method of claim 16, wherein:
the junction apparatus further comprises an elastomeric O-ring disposed in the second portion of the housing, and
installing the outer sleeve further includes engaging the outer sleeve with the elastomeric disposed in the second portion of the housing, thereby forming a watertight seal between the outer sleeve and the second portion of the housing.

18. The method of claim 15, wherein:
an inner threaded interface of the first fastener is engaged with a threaded interface of the first portion of the housing; and
engaging the first fastener comprises screwing the first fastener onto the threaded interface of the first portion of the housing.

19. The method of claim 18, wherein:
an inner threaded interface of the second fastener is engaged with an outer threaded interface of the outer sleeve; and
engaging the second fastener comprises screwing the second fastener onto the outer threaded interface of the outer sleeve.

* * * * *